United States Patent
Zuffa

(10) Patent No.: US 12,011,855 B2
(45) Date of Patent: Jun. 18, 2024

(54) METHOD AND MOULD FOR MAKING HOLED OBJECTS FROM PLASTIC MATERIAL

(71) Applicant: SACMI COOPERATIVA MECCANICI IMOLA SOCIETA' COOPERATIVA, Imola (IT)

(72) Inventor: Zeno Zuffa, Borgo Tossignano (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 25 days.

(21) Appl. No.: 17/782,030

(22) PCT Filed: Nov. 30, 2020

(86) PCT No.: PCT/IB2020/061261
§ 371 (c)(1),
(2) Date: Jun. 2, 2022

(87) PCT Pub. No.: WO2021/111271
PCT Pub. Date: Jun. 10, 2021

(65) Prior Publication Data
US 2022/0371235 A1    Nov. 24, 2022

(30) Foreign Application Priority Data

Dec. 4, 2019    (IT) .................. 102019000022992

(51) Int. Cl.
*B29C 43/36*    (2006.01)
*B29C 43/08*    (2006.01)
(Continued)

(52) U.S. Cl.
CPC ............ *B29C 43/361* (2013.01); *B29C 43/08* (2013.01); *B29C 43/58* (2013.01);
(Continued)

(58) Field of Classification Search
None
See application file for complete search history.

(56) References Cited

U.S. PATENT DOCUMENTS

| 3,060,509 A | 10/1962 | McCubbins, Jr. |
| 5,204,127 A | 4/1993 | Prusha |

FOREIGN PATENT DOCUMENTS

| EP | 1871585 A2 | 1/2008 |
| WO | 9422651 A1 | 10/1994 |

(Continued)

OTHER PUBLICATIONS

Search Report and Written Opinion for International Application No. PCT/IB2020/061261 dated Feb. 15, 2021, 13 pages.

*Primary Examiner* — Robert J Grun
(74) *Attorney, Agent, or Firm* — Pearne & Gordon LLP; Bryan M. Gallo

(57) ABSTRACT

A method for making an object (2) from plastic material, having a wall (21) and a through hole (22) formed in the wall (21), comprises the following steps: preparing a dose (20) of extruded plastic material; preparing a mould (1), having a first half mould (11) and a second half mould (12), mutually movable along a longitudinal axis (A1), wherein the first half mould (11) includes a body (111) and a plunger (112), the plunger (112) being movable relative to the body (111) between a retracted position and an advanced position; positioning the dose (20); closing the mould (1) to form a closed moulding space (V); moving the plunger (112) from the retracted position to the advanced position to squeeze the dose (20) so that the plastic material is forced to occupy the moulding space (V).

7 Claims, 7 Drawing Sheets

(51) Int. Cl.
  *B29C 43/58* (2006.01)
  *B29K 101/12* (2006.01)
  *B29K 309/08* (2006.01)
  *B29L 31/56* (2006.01)

(52) U.S. Cl.
  CPC .. *B29C 2043/5808* (2013.01); *B29K 2101/12* (2013.01); *B29K 2309/08* (2013.01); *B29L 2031/565* (2013.01)

(56) References Cited

FOREIGN PATENT DOCUMENTS

| | | | |
|---|---|---|---|
| WO | 2006040627 | A2 | 4/2006 |
| WO | 2006040630 | A2 | 4/2006 |
| WO | 2006040661 | A2 | 4/2006 |
| WO | 2006113185 | A2 | 10/2006 |
| WO | 2007009544 | A1 | 1/2007 |
| WO | 2019207420 | A1 | 10/2019 |

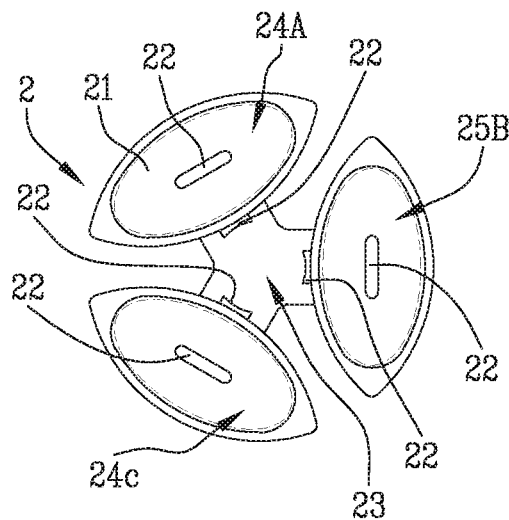
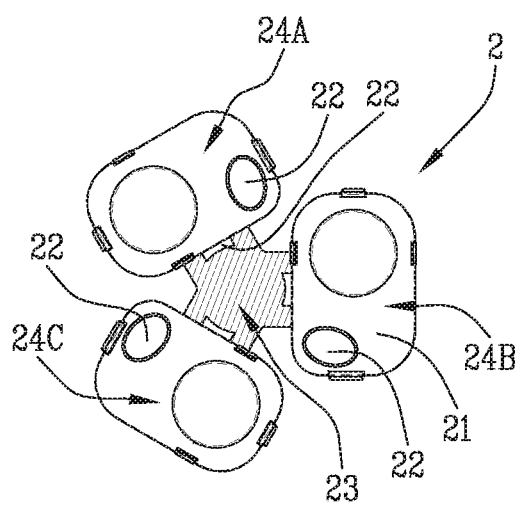
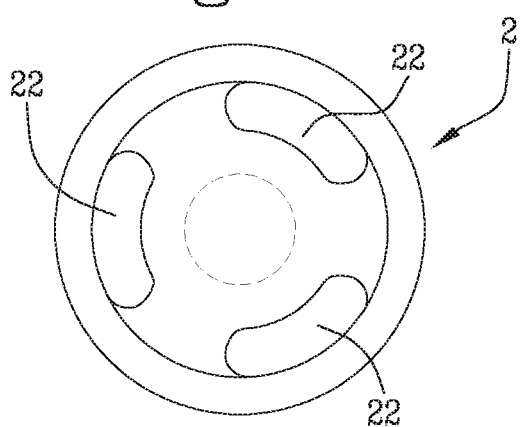
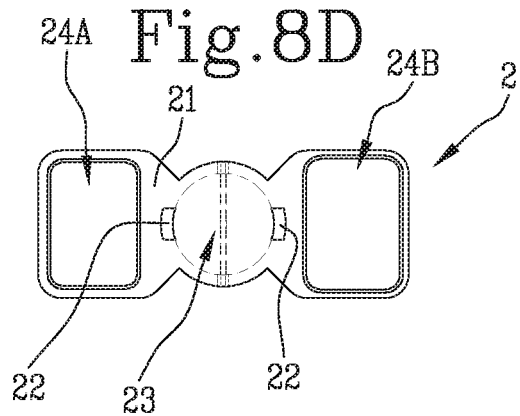
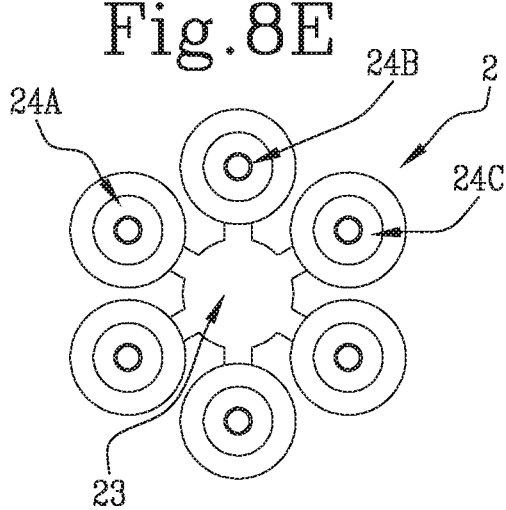
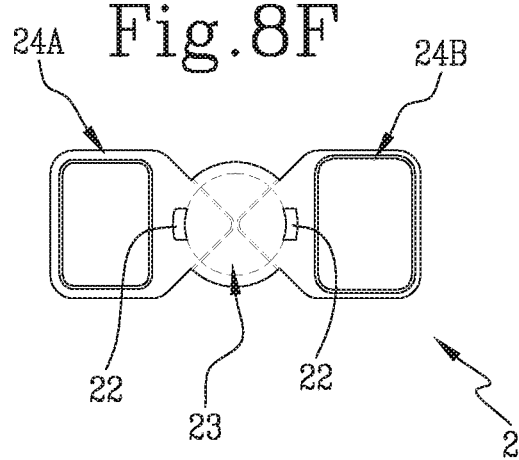

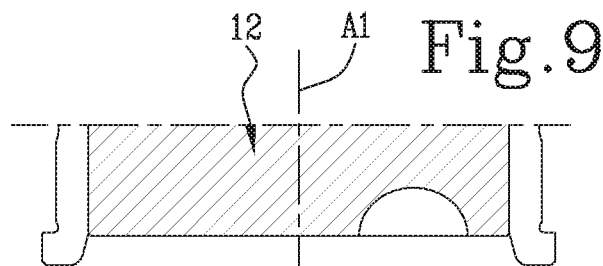
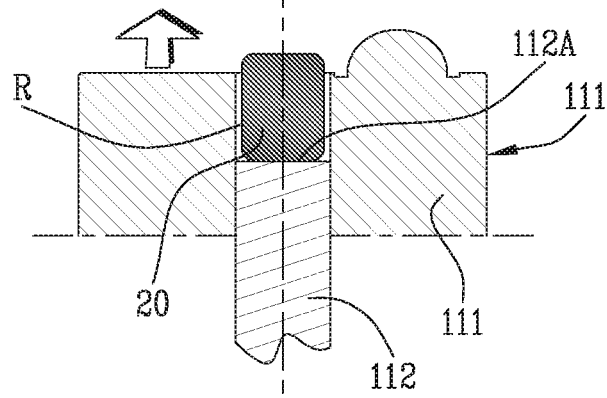
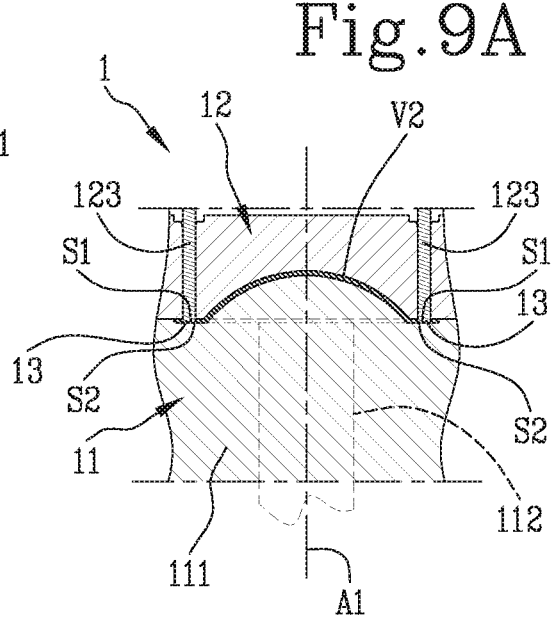
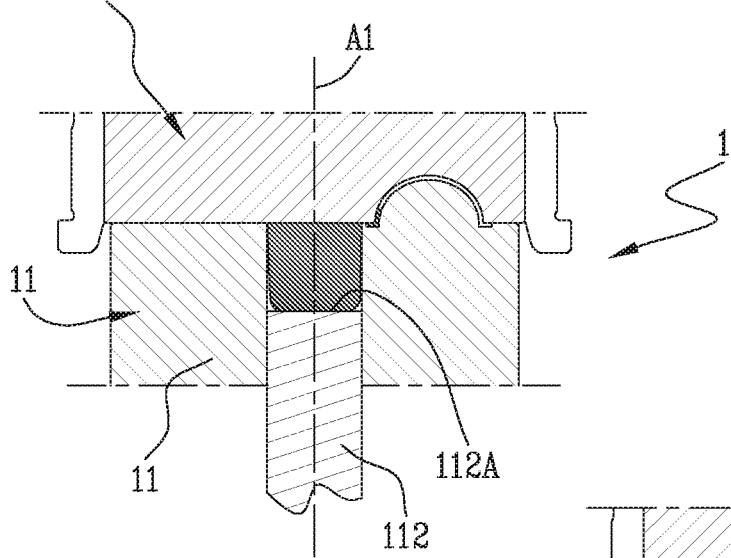
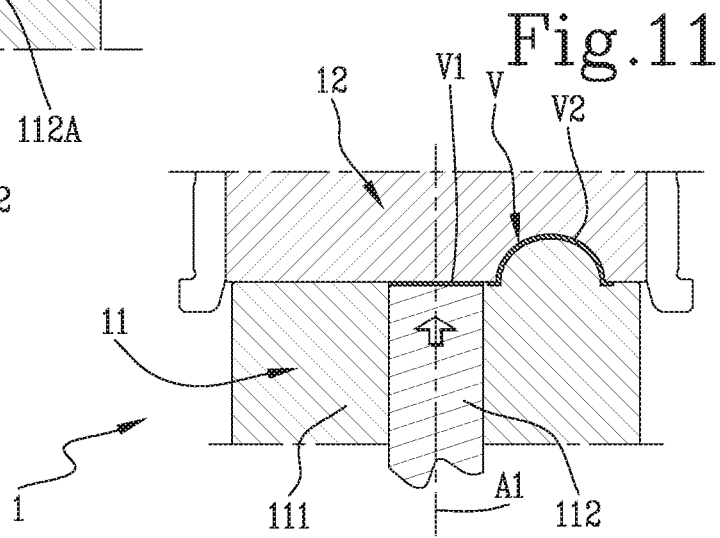

METHOD AND MOULD FOR MAKING HOLED OBJECTS FROM PLASTIC MATERIAL

TECHNICAL FIELD

This invention relates to a method and a mould for making an object from plastic material, the object having a wall and at least one through hole formed in the wall.

This disclosure addresses the moulding sector for the manufacture of objects from plastic, or thermoplastic, material.

BACKGROUND ART

In this sector, the prior art—for example, patent document WO2006/040661, in the name of this applicant—teaches the use of a mould having two half moulds that are mutually movable to squeeze a dose of plastic material, which is interposed between them, to force the material to occupy a moulding space defined by the two half moulds when they are close together, at the closed position of the mould. In this context, also known from patent documents WO2006/040627 and WO2006/040630, in the name of this applicant, are solutions in which the dose is squeezed by a plunger housed inside one of the two half moulds. These example solutions, however, regard objects having a simple shape, in particular preforms, or parisons, intended to be blow moulded to form containers for liquids.

In effect, compression moulding of plastic objects, although it offers many advantages over injection moulding, is widely used only for manufacturing objects which are particularly simple in shape; indeed, compression moulding is problematical where the objects to be made have complex shapes, such as, for example, holed objects or with objects with multiple cavities that interconnected by a sprue.

In this regard, it is noted that patent document WO2007/009544, in the name of this applicant, describes a compression mould that allows making a relatively complex object, including a hole and a hinge. In this solution, the hole is made by using a dose of material that is annular in shape. This mould, however, is particularly complex and even this technology is unsuitable for making variously shaped complex objects in a simple manner by compression moulding.

Patent document WO94/22651A1 discloses a compression mould configured to form hollow objects, but having a relatively simple shape.

Patent document U.S. Pat. No. 3,060,509A discloses an injection mould configured to form hollow objects; hence, this document does not provide that the objects are formed starting from a dose of extruded material previously prepared.

DISCLOSURE OF THE INVENTION

This disclosure has for an aim to provide a method and a mould for making objects from plastic material to overcome the above mentioned disadvantages of the prior art.

More specifically, the aim of this disclosure is to provide a method and a mould for making complex-shaped objects from plastic material to overcome the above mentioned disadvantages of the prior art.

This aim is fully achieved by the method and mould of this disclosure as characterized in the appended claims.

More specifically, this disclosure regards a method for making an object. Preferably, the object is made from plastic material (for example, PET). In particular, the object may be made from thermosetting plastic material.

The object may, more generally, be made from a polymeric material (for example, a natural or bioplastic polymer).

The object includes a wall. Preferably, the object has a hole (or a plurality of holes) formed in the wall. The hole may have a circular or oval or quadrangular or any other shape.

In an embodiment, the object is a cap for a container; the cap may have an internal thread. In an embodiment, the object includes a central sprue and a plurality of peripheral elements (which may, for example, define containers for contact lenses).

In an embodiment, the object is a preform or parison (suitable for blow moulding to make a container). In an embodiment, the object is a capsule for an infusion material (for example, coffee).

The method comprises a step of preparing a dose of extruded plastic material. The step of preparing the dose may include extruding the plastic material and portioning the plastic material to obtain the dose.

The method comprises a step of preparing a mould. The mould has a first half mould and a second half mould. The first and the second half mould are mutually movable along a longitudinal axis. More specifically, the first and the second half mould are mutually movable between a spaced-apart position, to define an open configuration (or position) of the mould and a close-together position, to define a closed configuration (or position) of the mould.

Preferably, the first half mould includes a body and a plunger (also known as "syringe"). The plunger is movable relative to the body between a retracted position, where it acts in conjunction with the body to form a recess, and an advanced position, where it at least partly occupies the recess.

The method comprises a step of positioning the dose in contact with the first half mould. More specifically, at least part of the dose is positioned in the recess.

The method comprises a step of closing the mould to form a closed moulding space, delimited by the first half mould and the second half mould. More specifically, the step of closing the mould comprises moving the first half mould and the second half mould from the spaced-apart position to the close-together position. It should be noted that the moulding space is enclosed entirely between the first half mould and the second half mould.

The method comprises a step of moving the plunger from the retracted position to the advanced position to squeeze the dose so that the plastic material is forced to occupy the moulding space.

Preferably, when the mould is closed, a first contact surface of the first half mould is abutted against (that is, is in contact with) a second contact surface of the second half mould. That way, the mould forms an interrupting column which is surrounded by the material squeezed by the plunger to form the through hole in the wall of the object.

It should be noted, therefore, that the moulding method of this disclosure is a method of compression moulding or (more specifically) of transfer moulding by compression.

Preferably, the movement of the plunger is synchronized with the movement of the first and second half moulds towards each other in such a way that the first and second contact surfaces are already abutted against each other when the plastic material initially contained in the dose reaches the interrupting column. This prevents formation of an unwanted film of plastic material in the hole of the moulded object.

More specifically, the movement of the plunger is started after the movement of the first and the second half mould towards each other has been completed. Thus, the step of moving the plunger from the retracted position to the advanced position is carried out after the mould has been closed.

The movement of the plunger might also be started before the movement of the first and the second half mould towards each other has been completed (thus, before the first and second contact surfaces come into contact) but in any case, in such a way that the plastic material reaches the interrupting column after the first and second contact surfaces have come into contact with each other).

The plunger moves along a thrust axis. In an embodiment, the interrupting column is misaligned with the thrust axis (and/or with the longitudinal axis).

It should be observed that in the case where the interrupting column is misaligned with the longitudinal axis, the hole in the object will be eccentric. It should be observed that the object need not have a non-axisymmetric shape and/or need not be a solid of revolution.

Preferably, the thrust axis is parallel to, or coincides with, the longitudinal axis; it should be noted, however, that the thrust axis might also be transverse, perpendicular or oblique to the longitudinal axis. In an embodiment, the dose has a compact shape, without holes. Hence, the dose is not annular in shape. Thus, when the dose is squeezed by the plunger moving from the retracted to the advanced position, it surrounds the interrupting column.

In an embodiment, the thrust axis is parallel to, or coincides with, the longitudinal axis and the moulding space has a flattened shape along a moulding plane that is transverse to the thrust axis, so the action of the plunger forces the material the dose is made of to be transferred predominantly along directions orthogonal to the thrust axis. It should be noted that the moulding space may have a flattened shape irrespective of whether or not there are interrupting columns. The expression "flattened shape" is used to mean that the moulding space (hence the moulded object) extends in a plane orthogonal to the thrust axis to a significantly greater extent than it does along the thrust axis (for example at least two or three times as much).

Preferably, the longitudinal axis is oriented along the weight force and the first half mould is positioned under the second half mould along the longitudinal axis.

Preferably, the first half mould defines a cavity and the second half mould, at the closed position, is located at least partly inside the cavity.

The moulding space extends at least partly around the longitudinal axis. In an embodiment, the step of closing the mould includes moving a drawer along a respective axis (which, in an embodiment, is a transverse axis that intersects the longitudinal axis); more specifically, the transverse axis may be orthogonal to the longitudinal axis or oblique to the longitudinal axis. The drawer may be part of the first or the second half mould; at one end of it, the drawer defines the first contact surface (if it is part of the first half mould) or the second contact surface (if it is part of the second half mould). That way, the drawer allows forming through holes whose orientation is defined by the axis along which the drawer moves. More specifically, where the axis along which the drawer moves is perpendicular to the longitudinal axis, the drawer allows forming a radial hole, that is to say, a hole that is perpendicular to the longitudinal axis.

In an embodiment, the interrupting column is oriented longitudinally (that is, it is parallel to the longitudinal axis). That way, the interrupting column allows forming through holes that are parallel to the longitudinal axis.

In an embodiment, the first and the second half mould are shaped in such a way that the moulding space comprises a zone intended to form a sprue of the object to be moulded, and a plurality of peripheral zones. In an embodiment, said zone is a central zone, aligned with the longitudinal axis; in this embodiment, the peripheral zones surround the central zone. In other embodiments, said zone is not aligned with the longitudinal axis. The peripheral zones are intended to form a multiplicity of objects connected to the sprue.

In an embodiment, the zone intended to form the sprue extends along a plane perpendicular to the longitudinal axis; in particular, said zone extends completely develops in the plane perpendicular to the longitudinal axis, or it is included in said plane.

In an embodiment, the zone intended to form the sprue includes a central portion, being aligned with the longitudinal axis and having a first width, and a plurality of connecting portions having a second width greater than the first width and connecting said central portion to the peripheral zones of said plurality. It is provided, in an embodiment, that the central portion and the connecting portions extend along the plane perpendicular to the longitudinal axis, namely be coplanar. Preferably, the central portion has an area equal (or corresponding) to a top end surface of the plunger.

In an embodiment, the method comprises a step of weakening a zone of the moulded object interposed between the sprue and one of the objects of the multiplicity (for example, by scoring): this facilitates subsequent separation of each object of the multiplicity from the sprue.

It should be noted that this disclosure provides a method (and a mould) for forming a multiplicity of objects from a single dose of plastic material. This allows reducing the number of manipulating parts (configured to manipulate the dose and to position it in the mould).

More specifically, when the mould is closed, an interrupting column is positioned between the central zone and each of the peripheral zones of the moulding space. That way, holes are formed between the sprue and each object of the multiplicity of objects to facilitate subsequent separation of each object of the multiplicity from the sprue.

There may also be holes in the sprue itself: in this case, at least one interrupting column is positioned in the central zone of the moulding space.

In an embodiment, the plunger defines a top end surface which, when the mould is closed, delimits the bottom of the central zone of the moulding space. Thus, when the plunger is at the extracted position, it delimits the zone of the moulding space that will form the sprue.

The method may also comprise a step of detecting the pressure exerted by the plunger (on the plastic material) and a step of controlling the movement of the plunger from the retracted position to the advanced position as a function of that pressure.

In an embodiment, a volume of the recess is smaller than the closed moulding space. So, the dose partially arises from the recess, previously to the step of closing the mould. Hence, the closing of the mould causes a partial compression of the dose, while the plunger is still in the retracted position. Subsequently, the moving of the plunger completes the compression of the dose, forcing it to uniformly occupy the closed moulding space.

This disclosure also relates to a mould for making an object from plastic (or polymeric) material. The object has a wall. The object preferably also has a through hole (or at least one hole or a plurality of holes) formed in the wall.

It should be noted that by "wall" is meant a front wall, a side wall, a set of front wall and side wall, a set of front or side wall and related appendages, or any other wall that makes up the object.

The mould comprises a first half mould. The first half mould includes a body and a plunger which is movable relative to the body between a retracted position, where it acts in conjunction with the body to form a recess for receiving all or part of an extruded dose of plastic material, and an advanced position, where it at least partly occupies the recess.

The mould comprises a second half mould. The first and the second half mould are mutually movable along a longitudinal axis between an open position (or configuration) of the mould, to allow extracting the object from the mould, and a closed position (or configuration) of the mould, where they delimit a closed moulding space. More specifically, at the open position (or configuration) of the mould, the first and the second half mould are mutually spaced and at the closed position (or configuration) of the mould, the first and the second half mould are close together. The recess is open onto the moulding space.

The first and second half moulds each comprise a body and a protuberance protruding from the body, where the first and second contact surfaces are each defined on the respective protuberance. The protuberance of the first half mould and that of the second half mould thus form the interrupting column.

The mould comprises a thrust actuator connected to the plunger to move it from the retracted position to the advanced position, thereby squeezing the dose so that the plastic material is forced to occupy the moulding space. The thrust actuator may be hydraulic or pneumatic or electromechanical.

Preferably, the first and the second half mould include a first and a second contact surface, respectively. When the mould is at the closed position, the first and second contact surfaces are abutted against each other so that the mould forms an interrupting column, which is surrounded by the moulding space, to form the through hole in the wall of the object.

Preferably, the plunger is movable along a thrust axis which is parallel to, or coincides with, the longitudinal axis; the interrupting column is misaligned with the thrust axis; the longitudinal axis is oriented along the weight force; the first half mould is positioned under the second half mould along the longitudinal axis.

In an embodiment, the mould comprises a sensor, configured to detect the pressure exerted by the plunger, and a control unit, connected to the sensor and to the thrust actuator and programmed to control the thrust actuator in response to the pressure detected by the sensor.

Thus, the plunger may fulfil a plurality of functions: it houses the dose, transfers the dose from the recess to the moulding space (when the mould is already closed, thus preventing the plastic material from leaking out of the mould) and (through the control of the thrust actuator) it compensates for any errors in the amount of material inserted.

The moulding space extends at least partly around the longitudinal axis. In an embodiment, at least one between the first and the second half mould comprises a drawer (or at least one drawer or a plurality of drawers), movable along a transverse axis that intersects the longitudinal axis. At one end of it, the drawer defines the first contact surface or the second contact surface, respectively. That way, objects with holes oriented transversely to the longitudinal axis (that is, radial holes) can be formed by compression moulding (or, more precisely, by transfer moulding by compression).

In an embodiment, the first and the second half mould are shaped in such a way that the moulding space comprises a central zone, aligned with the longitudinal axis and intended to form a sprue of the object to be moulded, and a plurality of peripheral zones; more specifically, when the mould is closed, an interrupting column is positioned between the central zone and each of the peripheral zones of the moulding space.

Preferably, the interrupting column is oriented longitudinally. That way, objects with holes oriented in parallel with the longitudinal axis (that is, longitudinal holes) can be formed by compression moulding (or, more precisely, by transfer moulding by compression).

Preferably, the mould includes a plurality of interrupting columns; preferably, the columns of the plurality are oriented longitudinally. Each column of the plurality of columns is configured to form a corresponding hole in the object (which, in this embodiment, has a plurality of holes).

It should be noted that this disclosure provides a method for making an object with one or more radial holes (made using one or more drawers) and/or with one or more longitudinal holes (made using one or more interrupting columns oriented longitudinally): thus, the interrupting columns and the drawers may be present as alternatives to each other or in combination.

In an embodiment, at least one between the first and the second half mould includes a projection connected to the rest of the respective half mould by an elastic element; at one end of it, the projection defines the first or the second contact surface, respectively. In each of the first and second half moulds, the projection is held at rest by the spring, at a first position, and, when the first and second contact surfaces come into contact, the projection is pushed to a second position; the projection (hence the protuberance) projects further from the body at the first position than it does at the second position. That way, when the mould is being closed, the first and second contact surfaces come into contact with each other before the mould is completely closed (that is, before the mould reaches the closed configuration).

In an embodiment, the plunger defines a top end surface which, when the mould is closed, delimits the bottom of a portion of the moulding space; more specifically, the top end surface of the plunger has relief portions for forming corresponding impressions or weakened portions on the object.

This disclosure also relates to a machine for making objects from plastic (or, generally, polymeric) material. The objects may be made in a continuous cycle or by moulding a plurality of objects at a time. The objects have a wall and, preferably, a through hole (or at least one hole or a plurality of holes) formed in the wall. Preferably, the machine comprises a plurality of moulds according to one or more aspects of this disclosure.

In an embodiment, the machine comprises a rotary carousel that rotates about an axis of rotation and the moulds of the plurality of moulds are associated with the carousel. Thus, in an embodiment, the machine is a rotary machine. More specifically, in this embodiment, the machine comprises a rotary carousel of the type described in patent document EP1871585, in the name of this Applicant and incorporated herein by reference. It is expressly understood that all the functional and structural features of the apparatus of patent document EP1871585 can be applied to this embodiment of the machine (and specifically of the carousel) described herein.

In another embodiment, the machine is a reciprocating machine. In this embodiment, the machine comprises a lower die block, including a plurality of lower half moulds, adapted to simultaneously receive a corresponding plurality of doses, and an upper die block including a plurality of upper half moulds. This variant of the machine has the advantage of allowing the doses to be positioned on the half moulds when the half moulds are stationary, making positioning easier. The upper die block and the lower die block are movable relative to each other between an open configuration, where they are spaced apart to allow the lower die block to receive the plurality of doses, and a closed configuration, where they form a plurality of closed moulding spaces, each of which is delimited by a corresponding lower half mould of the plurality of lower moulds and a corresponding upper half mould of the plurality of upper moulds.

The machine (in the embodiment where it is a reciprocating machine) may include a moulding unit (or station) to make the objects and, preferably, an additional unit (or station) downstream of the moulding unit. The moulding unit may include an extruder to extrude the plurality of doses and a plurality of moulds, defined by the lower die block and the upper die block, to receive the plurality of doses and to form the plurality of objects. It should be noted that the doses of the plurality are preferably received while the lower die block is stationary (and the upper die block is also stationary); this makes the machine simpler than it is in the rotary variant embodiment of it (where, on the contrary, the doses are positioned on the rotary carousel).

The additional unit may be configured, for example, to make lines of weakness on the objects formed (for example, the lines of weakness may be made between the sprue and each peripheral element), and/or to separate the peripheral elements from the sprue, and/or to associate with each other individually moulded objects.

The machine may also include a release unit (or station) for releasing the objects. The moulding unit, the additional unit and the releasing unit are preferably positioned along a conveyor, spaced apart from each other. The conveyor may include a turntable and the units may be disposed around the conveyor.

This disclosure also relates to an object made from thermoplastic (or, generally, polymeric) material, comprising a wall and a plurality of through holes formed in the wall. Preferably, the wall defines an outer surface without gate marks (gate marks are unwanted protrusions or scars or score marks—both positive and negative, in the sense of excess material or absence of material—made when the liquid material enters the compression chamber). In effect, the object is made by compression moulding from a dose of thermoplastic material, using, for example, the method according to one or more of the aspects of this disclosure. It should be noted that gate marks are defects typical of objects made by injection moulding, whilst objects made by compression moulding or transfer moulding by compression (like those described in this disclosure, made with the machine and method of this disclosure) are free of defects of this kind.

It should also be noted that the wall of the object is, preferably, free of marks which are typically found on objects made by traditional compression moulding methods and which are traceable to surface defects present on the doses after the doses have been cut and/or manipulated; in particular, in traditional compression moulding, cold flakes or scars may form along the edges of the dose and, during the moulding process, these may move along the surface of the central mass of the dose, which is still hot, without blending into it. In the method of this invention (in particular, in transfer moulding by compression), defects of this kind can be considerably reduced, for example by adopting suitable systems for heating and cooling the mould to allow levelling the temperature of the inside surface of the mould. Moreover, in cases where the object includes a sprue and a multiplicity of peripheral elements connected to the sprue (and intended, in use, to be separated from the sprue), these defects can be restricted to the sprue in order to obtain peripheral elements of a higher quality.

In an embodiment, the thermoplastic material is reinforced with fibres of a reinforcement material (for example, glass fibre). These fibres make the object more robust and resistant.

It should be noted that the method and mould of this disclosure are particularly suitable for use with a reinforced thermoplastic material. In effect, the wear load is concentrated in particular on the plunger, while the other parts of the mould are less subject to wear. Only the plunger, therefore, which has a limited cost, will need to be periodically replaced, while the other parts of the mould, which have a higher cost, can be kept. With traditional injection moulds, on the other hand, wear makes it necessary to replace complex (high-cost) components such as, for example, injectors, gates and heating chambers.

In this context, it should be noted that in one example embodiment, the body of the first half mould may be provided with a housing (for example, a blind hole or a through hole or a niche of any kind) to house the plunger. The plunger may be removably inserted in the housing to simplify periodic replacement of the plunger. In an embodiment, the housing may be provided with a removable internal liner or bushing designed to be in operative (sliding) contact with the plunger; the liner or bushing at least partly delimits the recess. The liner or bushing is a part that can be replaced with another liner or bushing easily and at a reduced cost (in order to overcome the problem of wear of the surface that is in sliding contact with the plunger).

Preferably, the object is flattened in shape along a compression plane; the thermoplastic material the object is made from is distributed uniformly along the compression plane. In particular, the density of the material, quenching rate (that is, shrinkage lines during compaction) and/or stress state of the object are uniform in a transverse dimension and in a longitudinal dimension (perpendicular to each other).

The material of the dose may have a high viscosity.

BRIEF DESCRIPTION OF DRAWINGS

These and other features will become more apparent from the following detailed description of a preferred embodiment, illustrated by way of non-limiting example in the accompanying drawings, in which:

FIGS. 8A, 8B, 8C, 8D, 8E, 8F show different embodiments of an object of this disclosure;

FIG. 9 is a longitudinal cross section of the mould used to make the object of FIG. 8A in an open position;

FIG. 9A shows a detail of the mould of FIG. 9 in a longitudinal cross section orthogonal to the cross section of FIG. 9;

FIG. 10 shows the mould of FIG. 8 in a partly closed position, that is to say, with the upper half mould close to the lower half mould and with the plunger still at the retracted position;

FIG. 11 shows the mould of FIG. 8 in the closed position, with the upper half mould close to the lower half mould and with the plunger at the advanced position;

DETAILED DESCRIPTION OF PREFERRED EMBODIMENTS OF THE INVENTION

Figure 1A:
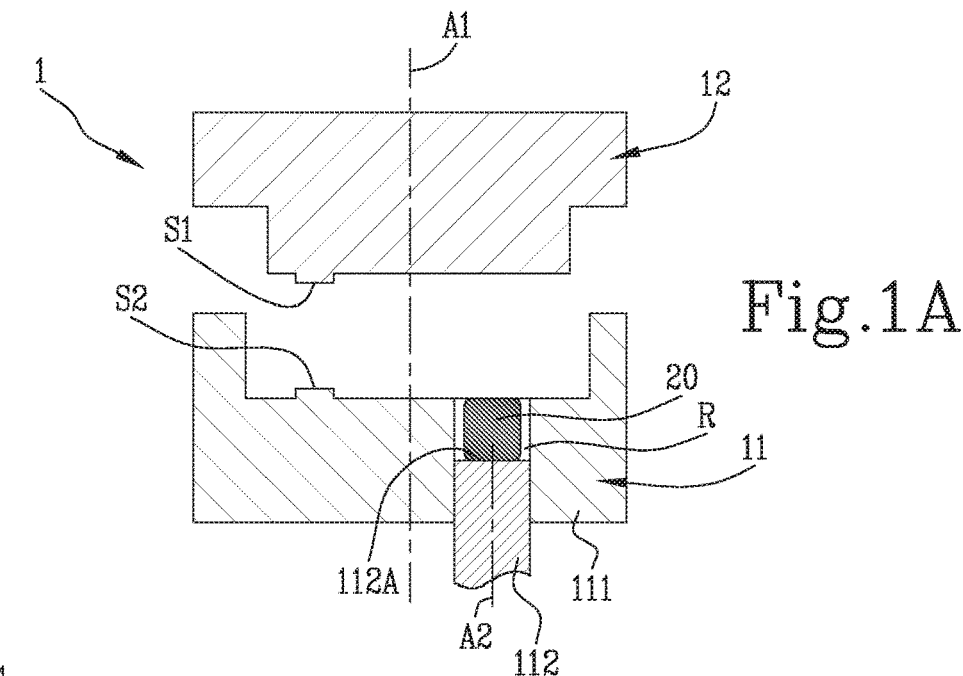
FIG. 1A schematically shows a mould according to this invention, in an open position.
Figure 1B:
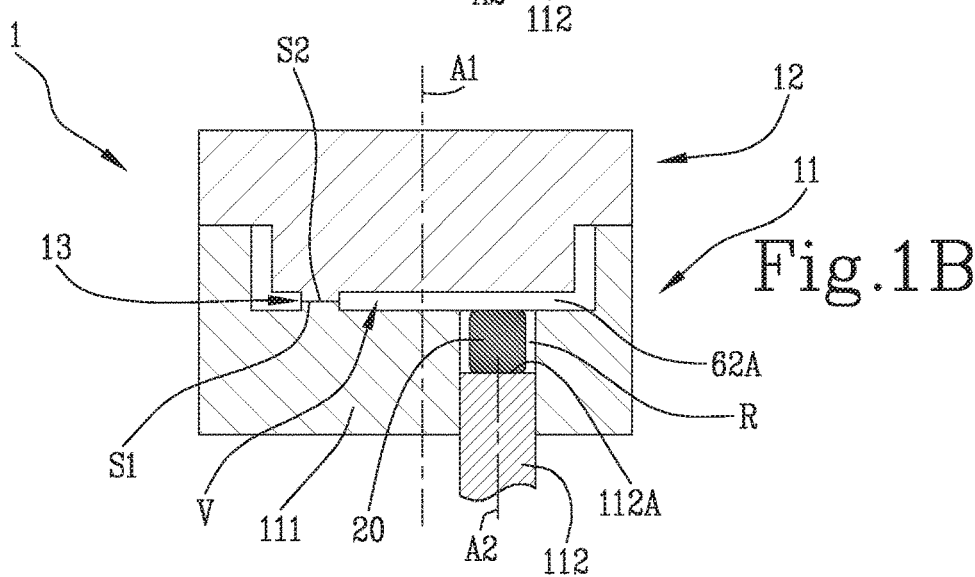
FIG. 1B shows the mould of FIG. 1A in a closed position.
Figure 1C:
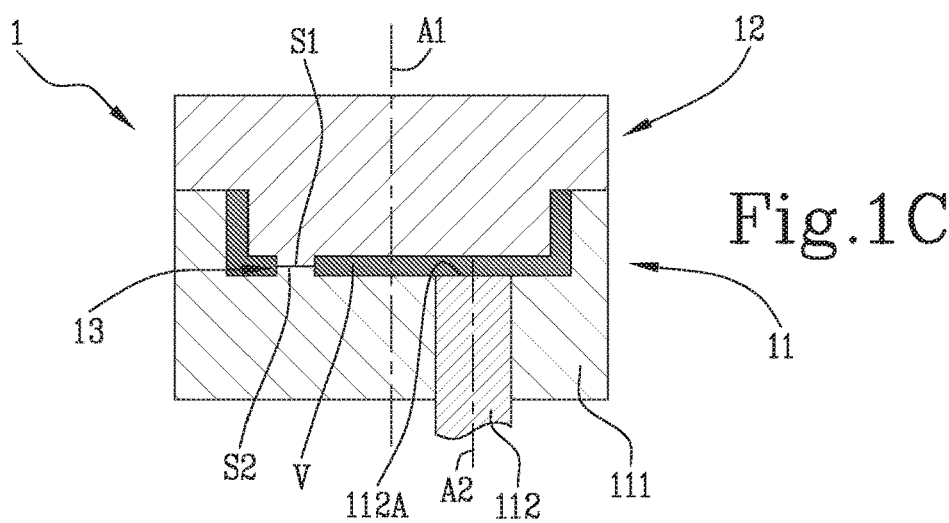
FIG. 1C shows the mould of FIG. 1B in a different operating configuration.
Figure 2:
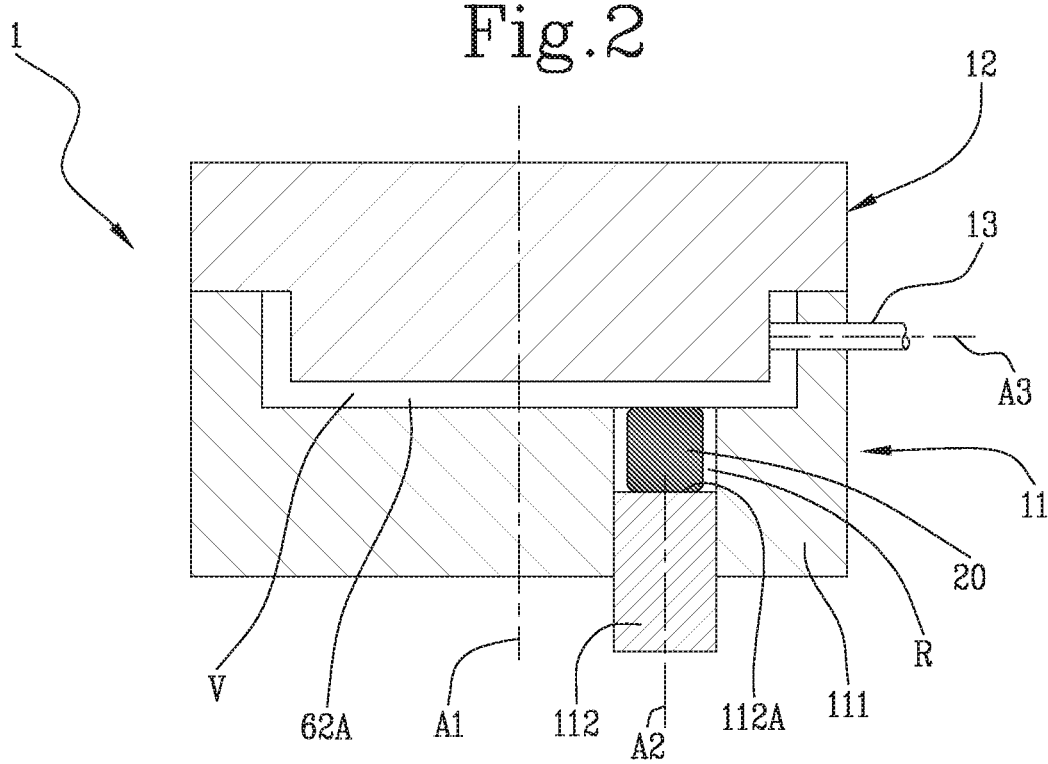
FIGS. 2, 3, 4 and 5 schematically show different variant embodiments of the mould of FIG. 1.
Figure 3:
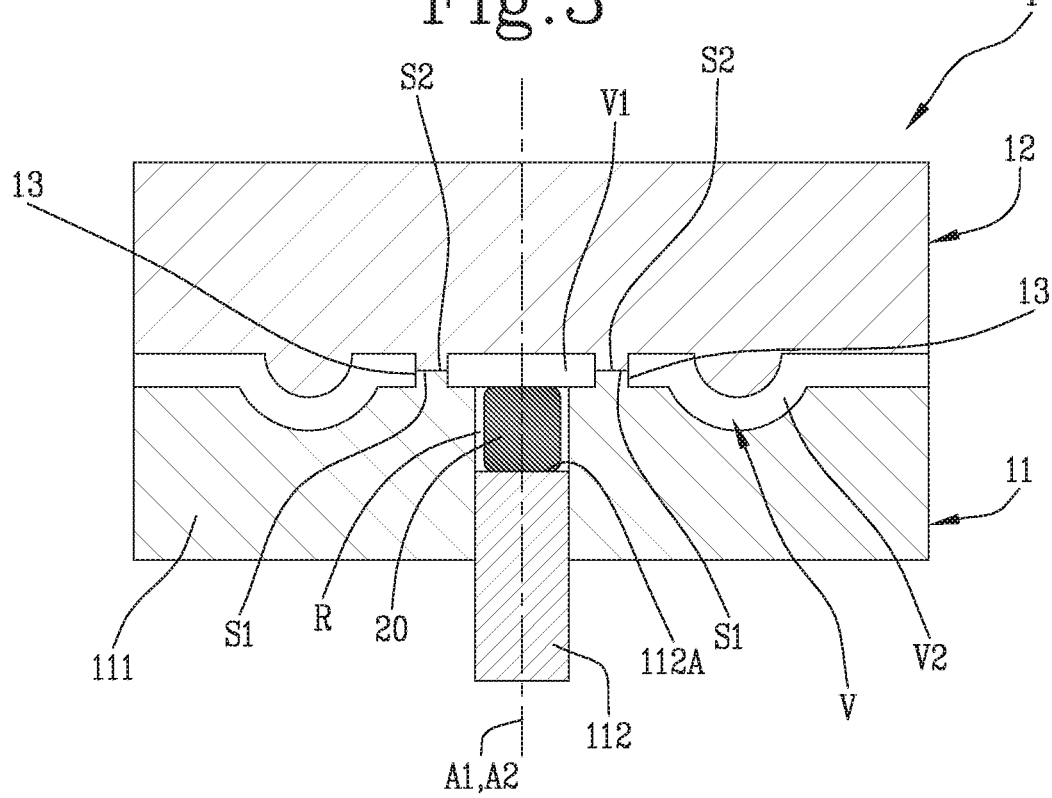
Figure 4:
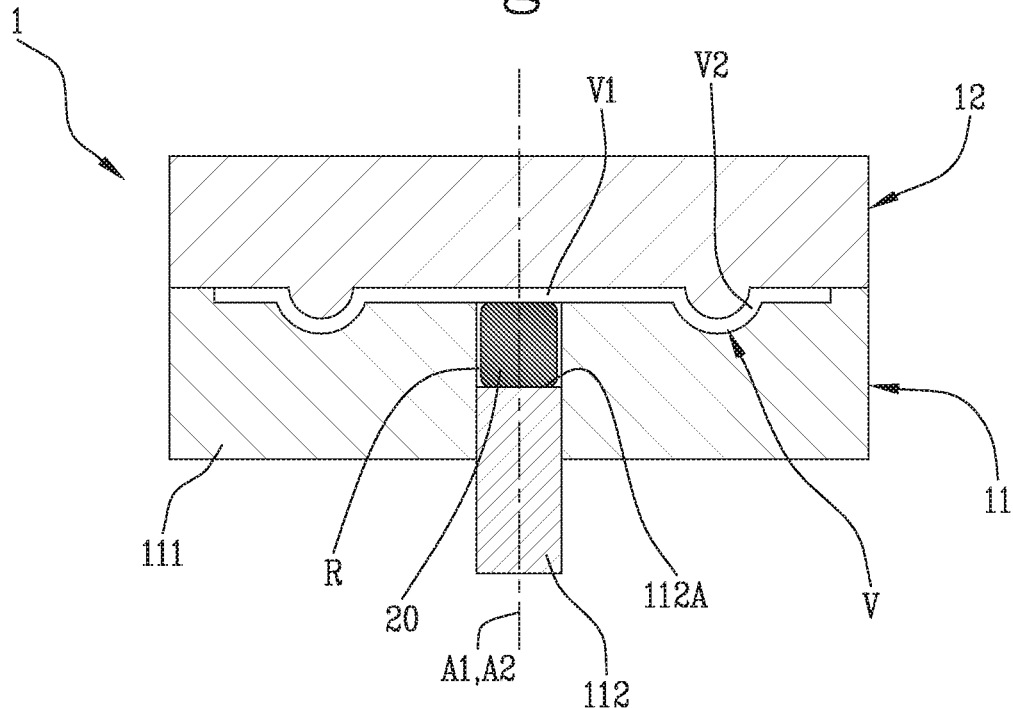
Figure 5:
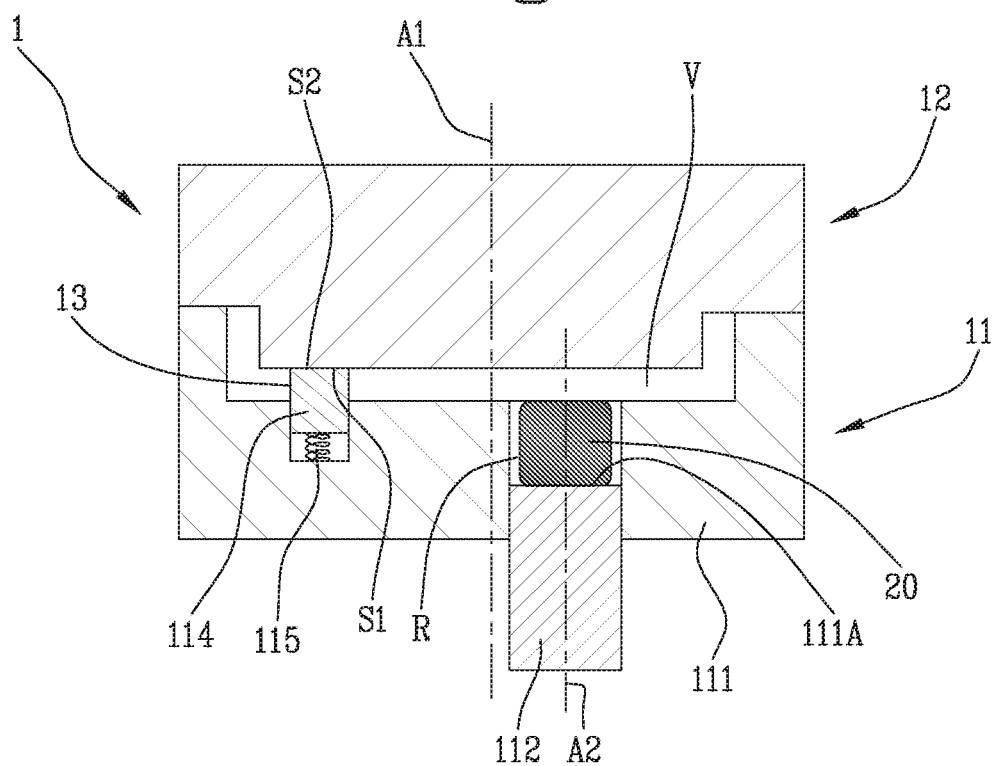
Figure 6:
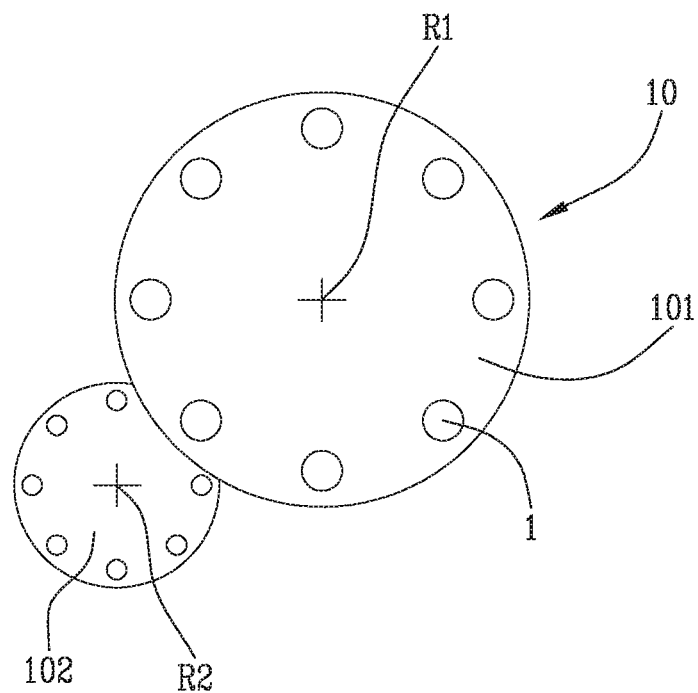
FIGS. 6 and 7 schematically show a machine according to different embodiments of this disclosure.
Figure 7:
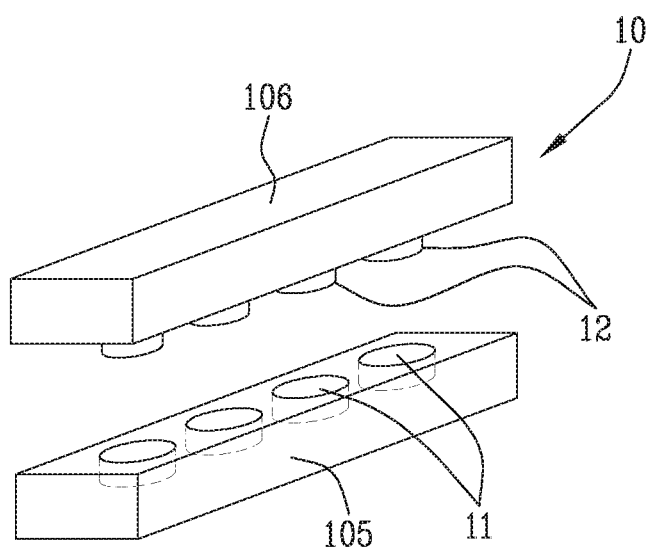
Figure 12:
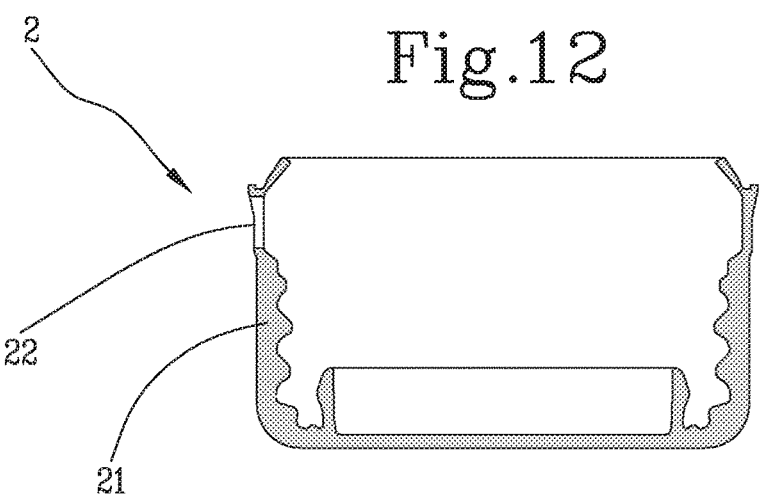
FIG. 12 shows an object according to an embodiment of this disclosure in which the object is a cap.
Figure 13:
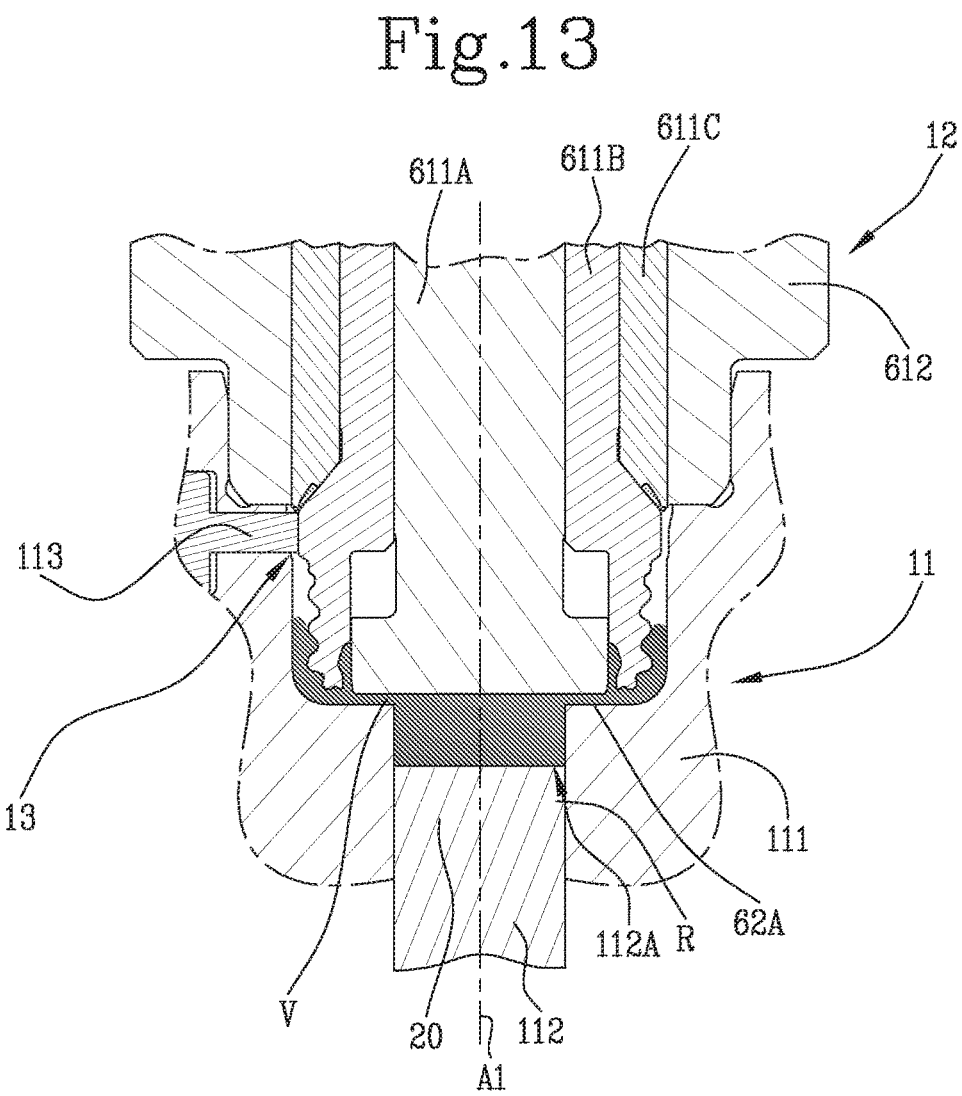
FIG. 13 shows the mould used to make the object of FIG. 12, in the closed position, with the plunger at an intermediate position between the retracted position and the advanced position.

With reference to the accompanying drawings, the numeral 1 denotes a mould for making an object 2 from plastic material.

The object 2 includes a wall 21. In at least one embodiment, the object 2 includes a hole 22 formed in the wall 21.

The mould 1 comprises a first half mould 11. The first half mould 11 defines a cavity. The mould 1 comprises a second half mould 12. The first and the second half mould 11, 12 are mutually movable along a longitudinal axis A1 between a spaced-apart position, which defines an open configuration (or position) of the mould 1 and a close-together position, which defines a closed configuration (or position) of the mould 1. In the closed configuration of the mould 1, the second half mould 12 is at least partly housed in the cavity of the first half mould 11.

The first half mould 11 includes a body 111 and a plunger 112. The plunger 112 is movable relative to the body 111 between a retracted position inside the body and an extracted position outside the body. More specifically, the plunger 112 is movable relative to the body 111 along a thrust axis A2. The thrust axis A2 is preferably parallel to, or coincides with, the longitudinal axis A1.

At the retracted position, the plunger 112 defines a recess R in the body 111. The recess R is configured to receive a dose 20 of material. At the advanced (or extracted) position, the plunger 112 occupies at least part of the recess (specifically, it fills the recess).

Thus, the dose 20 is placed in the mould 1 when the mould is in the open configuration (with the first and second half moulds 11, 12 spaced apart from each other) and the plunger 112 at the retracted position.

After that, there is a step of (partly) closing the mould 1, including a step of moving the first half mould 11 towards the second half mould 12. When the mould 1 is in the closed (or partly closed) configuration, the first and second half moulds 11, 12 delimit a closed moulding space V. The recess R opens onto the closed moulding space V. Closing the mould 1 may cause the dose 20 to be partly squeezed (in the case where the dose 20 protrudes partly from the recess R).

On completing the step of moving the first half mould 11 relative to the second half mould 12 (that is, after partly closing the mould 1), there is a step of moving the plunger 112 from the retracted position to the advanced position. It should be noted that the step of moving the plunger 112 from the retracted position to the advanced position reduces the size of the closed moulding space V since the recess R is occupied by the plunger 112. In addition, the step of moving the plunger 112 from the retracted position to the advanced position causes the dose 20 (or a part of it) to be transferred from the recess R to the moulding space V (that is, to the part of the moulding space V remaining after the plunger 112 is moved to the advanced position), until the dose 20 fills the moulding space V.

The plunger 112 defines a top end surface 112A which, when the mould is closed, contributes to delimiting the moulding space V.

Preferably, the half mould 11 is located under the half mould 12 (thus the half mould 11 is a lower half mould and the half mould 12 is an upper half mould). Thus, the top end surface 112A preferably delimits the bottom of a portion of the moulding space V. It should be noted that the dose 20 is preferably received on the top end surface 112A. The top end surface 112A may be provided with relief portions for forming corresponding impressions or weakened portions on the object 2.

In an embodiment, when the mould 1 is in the closed configuration, a first contact surface S1 of the first half mould 11 is abutted against a second contact surface S2 of the second half mould 12.

At least one between the first and the second contact surface S1, S2 protrudes inside the moulding space V with respect to the body of the first or the second half mould, respectively.

Thus, the mould 1 has an interrupting column 13 that forms a break in the moulding space V. The interrupting column 13 is surrounded by the material of the dose 20 transferred into the moulding space V by the plunger 112. Thus, at the interrupting column 13, the object 2 is provided with the hole 22.

The interrupting column 13 may be oriented in parallel with the longitudinal axis A1. In this case, the first and the second contact surface S1, S2 may be oriented (predominantly) perpendicularly to the longitudinal axis A1. The mould 1 may include a plurality of interrupting columns 13 (each defined by a respective first surface S1 of the first half mould 11 and a respective second surface S2 of the second half mould, abutted against each other). One or more interrupting columns 13 of the plurality may be oriented in parallel with the longitudinal axis A1. One or more interrupting columns 13 of the plurality may be oriented transversely (or perpendicularly) to the longitudinal axis A1.

In an embodiment, the lower half mould 11 includes a drawer 113. The drawer 113 is movable relative to the body 111 of the lower half mould 11. The drawer 113 is movable relative to the body 111 between an advanced position, where it protrudes into the moulding space V and comes into contact with the upper half mould 12, and a retracted position, where it is withdrawn into the body 111. It should be noted that when the drawer 113 is at the advanced position, it may define the interrupting column 13 (or one of the plurality of interrupting columns 13). It should be noted, therefore, that one end of the drawer 113 may define the first contact surface S1.

In an embodiment, the drawer 113 is movable relative to the body 111 along a transverse axis A3, which is transverse (or perpendicular) to the longitudinal axis A1. In another embodiment, the drawer 113 is movable relative to the body 111 along an axis which is parallel to the longitudinal axis A1.

In an embodiment, the upper half mould 12 includes a drawer 123. The drawer 123 is movable relative to the body of the upper half mould 12 between an advanced position, where it protrudes into the moulding space V and comes into contact with the lower half mould 11, and a retracted position, where it is withdrawn into the body of the upper half mould 12. It should be noted that when the drawer 123 is at the advanced position, it may define the interrupting column 13 (or one of the plurality of interrupting columns 13). It should be noted, therefore, that one end of the drawer 123 may define the second contact surface S2.

In an embodiment, the drawer 123 is movable relative to the body of the upper half mould 12 along an axis which is transverse (or perpendicular) to the longitudinal axis A1. In another embodiment, the drawer 123 is movable relative to the body of the upper half mould 12 along an axis which is parallel to the longitudinal axis A1.

In an embodiment, the first half mould 11 (or the second half mould 12) includes a projection 114 and an elastic element 115. The projection 114 is connected to the body of the first half mould 11 (or of the second half mould 12) by the elastic element 115. At one end of it, the projection 114 may define the first contact surface S1 (or the second contact surface S2). Thus, when the projection 114 comes into contact with the other half mould, it (at least partly) forms the interrupting column 13 (or one of the plurality of interrupting columns 13).

In an embodiment, the moulding space V comprises a central zone V1 and a plurality of peripheral zones V2. The peripheral zones V2 are located on the outside of the central zone V1; more specifically, the peripheral zones V2 surround the central zone V1. Preferably, the central zone V1 is aligned with the longitudinal axis A1 (that is, the longitudinal axis A1 passes through the central zone V1). Preferably, the moulding space V extends predominantly in directions orthogonal to the longitudinal axis A1.

The object 2 may include a sprue 23 and a plurality of peripheral elements 24A, 24B, 24C, connected to the sprue 23. The central zone V1 of the moulding space V is configured to form the sprue 23; the peripheral zones V2 of the plurality are configured to form corresponding peripheral elements 24A, 24B, 24C of the plurality.

The hole 22 may be defined in the sprue 23, in a peripheral element 24A, 24B, 24C or in an intermediate connecting zone between the sprue 23 and the peripheral element 24A, 24B, 24C. The object 2 may have a plurality of holes 22; the plurality of holes 22 may include, for each peripheral element 24A, 24B, 24C, a corresponding hole in a connecting zone between the peripheral element 24A, 24B, 24C and the sprue 23.

The object may have a weakened zone between the sprue 23 and each peripheral element 24A, 24B, 24C. The weakened zone may be defined by the hole 22 and/or by localized thinning. The weakened zone may be made in the mould 1 or by processing subsequent to moulding.

The peripheral zones 24A, 24B, 24C extend predominantly in planes which are orthogonal to the longitudinal axis A1; in any case, the peripheral zones 24A, 24B, 24C may be provided with holes, protrusions, hollows or thickened and/or thinned zones.

This disclosure also relates to a machine 10 for making the objects 2. The machine 10 comprises a plurality of moulds 1 according to one or more aspects of this disclosure.

In an embodiment, the machine 10 comprises a moulding carousel 101 which rotates about a respective axis of rotation R1. The moulding carousel 101 includes a plurality of moulds 1, disposed (preferably equispaced) round the circular periphery of the carousel. More specifically, the moulding carousel 101 may include a lower carousel, defining a plurality of lower half moulds (or first half moulds) 11 and an upper carousel, defining a plurality of upper half moulds (or second half moulds) 12. The upper carousel and the lower carousel are movable towards and away from each other to move the moulds 1 between the open position and the closed position.

The machine 10 may also comprise a transfer apparatus, configured to feed the doses 20 to the moulding carousel 101 and/or to disdose the moulded objects 2 from the moulding carousel 101. More specifically, the transfer apparatus may include a transfer carousel 102 which rotates about a respective axis of rotation R2. If the machine 10 comprises a moulding carousel 101, the machine is a rotary machine, configured to make objects 2 in a continuous cycle.

In an embodiment, the machine 10 comprises a lower die block 105, including a plurality of lower half moulds 11 (or first half moulds) and an upper die block 106, including a plurality of upper half moulds 12 (or second half moulds). The upper die block 106 and the lower die block 105 are movable towards and away from each other to move the moulds 1 between the open position and the closed position. The lower half moulds 11 and the upper half moulds 12 may be disposed on the lower die block 105 and on the upper die block 106, aligned with each other.

The object 2 may be an internally threaded cap for a container.

In an embodiment in which the object 2 is a cap, the second half mould 12 may include an inner core 611A, a central core 611B and an outer core 611C, configured to penetrate inside a cavity 62A of the first half mould 11 when the mould 1 is in the closed configuration. More specifically, the outer core 611C surrounds the central core 611B which in turn surrounds the inner core 611A. The inner core 611A, the central core 611B and the outer core 611C are movable relative to each other along the longitudinal axis A1; more specifically, in a possible embodiment, the inner core 611A and the outer core 611C are stationary, whilst the central core 611B is movable.

The second half mould 12 also includes an extractor 612, which surrounds the core 611 and is movable along the longitudinal axis A1 relative to each of the inner core 611A, the central core 611B and the outer core 611C. The central core 611B preferably includes a plurality of recesses configured to form the internal thread on the side wall of the cap.

In a sequence in which the mould 1 is opened, there is first of all a downward movement of all the components except the outer core 611C and the inner core 611A (in practice equivalent to an upward movement of the outer core 611C and of the inner core 611A); at this stage, the central core 611B and the cavity 62A remain adherent to the cap. After that, a specific actuator causes a downward movement of the cavity 62A away from the upper unit 61 and from the cap, thereby releasing an outside wall of the cap; at this stage, the central core 611B remains adherent to an inside wall of the cap. After that, the extractor 612 moves downwards and, being in contact with the upper edge of the cap, entrains the cap downwards with it; at first, the cap, pushed downwards by the extractor 612, entrains the central core 611B with it until the central core 611B reaches a stop shoulder (defined, for example, by the inner core 611A, which is stationary). When the central core 611B reaches the stop shoulder, the extractor 612 continues moving downwards and (if necessary with the aid of compressed air injected between the inner core 611A and the central core 611B) elastically deforms the side wall of the cap, until extracting the internal thread from the recesses of the central core 611B and releasing the inside wall of the cap.

The following paragraphs, listed in alphanumeric order for reference, are non-limiting example modes of describing this invention.

A. A method for making an object from plastic material, wherein the method comprises the following steps:
 preparing a dose of extruded plastic material;
 preparing a mould, comprising a first half mould and a second half mould which are mutually movable along a longitudinal axis, wherein the first half mould includes a body and a plunger, the plunger being movable relative to the body between a retracted position, where it acts in conjunction with the body to form a recess, and an advanced position, where it at least partly occupies the recess;
 positioning at least part of the dose in the recess;
 closing the mould to form a closed moulding space, delimited by the first half mould and the second half mould;
 moving the plunger from the retracted position to the advanced position to squeeze the dose so that the plastic material is forced to occupy the moulding space.

A1. The method according to paragraph A, wherein the plunger is moved from the retracted position to the advanced position along a thrust axis which is parallel to, or coincides with, the longitudinal axis.

A1.1. The method according to paragraph A1, wherein the moulding space has a flattened shape along a moulding plane that is transverse to the thrust axis, so the action of the plunger forces the material the dose is made of to be transferred predominantly along directions orthogonal to the thrust axis.

A2. The method according to any one of the preceding paragraphs from A to A1.1, wherein the object includes a wall and a through hole formed in the wall and wherein, when the mould is closed, a first contact surface of the first half mould is abutted against a second contact surface of the second half mould, so that the mould forms an interrupting column which is surrounded by the material squeezed by the plunger, thereby forming the through hole in the wall of the object.

A2.1. The method according to paragraph A2, wherein the movement of the plunger is synchronized with the movement of the first and the second half mould towards each other in such a way that the first and the second contact surface are already abutted against each other when the plastic material initially contained in the dose reaches the interrupting column.

A2.1.1. The method according to paragraph A2, wherein the movement of the plunger is started after the movement of the first and the second half mould towards each other has been completed.

A2.2. The method according to any one of paragraphs from A2 to A2.1.1, wherein the plunger moves along a thrust axis and the interrupting column is misaligned with the thrust axis.

A2.3. The method according to any one of paragraphs from A2 to A2.2, wherein the plunger moves along a thrust axis that is parallel to, or coincides with, the longitudinal axis.

A2.4. The method according to any one of paragraphs from A2 to A2.3, wherein the dose has a compact shape, without holes.

A2.5. The method according to any one of paragraphs from A2 to A2.4, wherein the plunger moves along a thrust axis and wherein the moulding space has a flattened shape along a moulding plane that is transverse to the thrust axis, so the action of the plunger forces the material the dose is made of to be transferred predominantly along directions orthogonal to the thrust axis.

A2.6. The method according to any one of paragraphs from A to A2.5, wherein the moulding space extends at least partly around the longitudinal axis and wherein the step of closing the mould includes moving a drawer along a transverse axis that intersects the longitudinal axis, the drawer forming part of the first half mould or the second half mould and defining, at one end of it, the first contact surface or the second contact surface, respectively.

A2.7. The method according to any one of paragraphs from A to A2.6, wherein the interrupting column is oriented longitudinally.

A3. The method according to any one of paragraphs from A to A2.7, wherein the longitudinal axis is oriented along the weight force.

A3.1. The method according to paragraph A3, wherein the first half mould is positioned under the second half mould along the longitudinal axis.

A4. The method according to any one of paragraphs from A to A3, wherein the object is made by compression moulding (or transfer moulding by compression).

A5. The method according to any one of paragraphs from A to A4, wherein the first and the second half mould are shaped in such a way that the moulding space comprises a central zone, aligned with the longitudinal axis and intended to form a sprue of the object to be moulded, and a plurality of peripheral zones.

A5.1. The method according to paragraph A5, wherein, when the mould is closed, an interrupting column is positioned between the central zone and each of the peripheral zones of the moulding space.

A5.2. The method according to paragraph A5 or paragraph A5.1, wherein the plunger defines a top end surface which, when the mould is closed, delimits the bottom of the central zone of the moulding space.

A6. The method according to any one of paragraphs from A to A5.2, comprising a step of detecting the pressure exerted by the plunger and a step of controlling the movement of the plunger from the retracted position to the advanced position as a function of that pressure.

B. A mould for making an object from plastic material, the mould comprising:
 a first half mould, including a body and a plunger, the plunger being movable relative to the body between a retracted position, where it acts in conjunction with the body to form a recess for receiving all or part of an extruded dose of plastic material, and an advanced position, where it at least partly occupies the recess;
 a second half mould, wherein the first and the second half mould are mutually movable along a longitudinal axis between an open position of the mould, to allow extracting the object from the mould, and a closed position of the mould, where they delimit a closed moulding space, the recess being open onto the moulding space;
 a thrust actuator, connected to the plunger to move it from the retracted position to the advanced position, thereby squeezing the dose so that the plastic material is forced to occupy the moulding space.

B1. The mould according to paragraph B, wherein the plunger is movable from the retracted position to the advanced position along a thrust axis which is parallel to, or coincides with, the longitudinal axis.

B1.1. The mould according to paragraph B1, wherein the moulding space has a flattened shape along a moulding plane that is transverse to the thrust axis, so the plunger is configured to force the material the dose is made of to be transferred predominantly along directions orthogonal to the thrust axis.

B2. The mould according to any one of the preceding paragraphs from B to B1.1, wherein the object includes a wall and a through hole formed in the wall, wherein the first and the second half mould include a first and a second contact surface, respectively, the first and the second contact surface being, when the mould is at the closed position, abutted against each other so that the mould forms an interrupting column, which is surrounded by the moulding space, to form the through hole in the wall of the object.

B2.1. The mould according to paragraph B2, comprising a control unit configured to synchronize the movement of the plunger with the movement of the first and the second half mould towards each other in such a way that the first and the second contact surface are already abutted against each other when the plastic material initially contained in the dose reaches the interrupting column.

B2.1.1. The mould according to paragraph B2.1, wherein the control unit is configured to start the movement of the plunger after the movement of the first and the second half mould towards each other has been completed.

B2.2. The mould according to any one of paragraphs from B2 to B2.1.1, wherein the plunger is movable along a thrust axis and the interrupting column is misaligned with the thrust axis.

B2.3. The mould according to any one of paragraphs from B2 to B2.2, wherein the plunger is movable along a thrust axis that is parallel to, or coincides with, the longitudinal axis.

B2.5. The mould according to any one of paragraphs from B2 to B2.4, wherein the plunger is movable along a thrust axis and wherein the moulding space has a flattened shape along a moulding plane that is transverse to the thrust axis, so the action of the plunger forces the material the dose is made of to be transferred predominantly along directions orthogonal to the thrust axis.

B2.6. The mould according to any one of paragraphs from B2 to B2.5, wherein the moulding space extends at least partly around the longitudinal axis and wherein the lower half mould (or the upper half mould) includes a drawer which is movable along a transverse axis that intersects the longitudinal axis, and defining, at one end of it, the first contact surface (or the second contact surface).

B2.7. The mould according to any one of paragraphs from B2 to B2.6, wherein the interrupting column is oriented longitudinally.

B2.8. The mould according to any one of paragraphs from B2 to B2.7, comprising a plurality of interrupting columns.

B2.8.1. The mould according to paragraph B2.8, wherein the columns of the plurality are oriented longitudinally (or at least one of them is).

B2.9. The mould according to any one of paragraphs from B to B2.8.1, wherein at least one between the first and the second half mould includes a projection connected to the rest of the respective half mould by an elastic element, the projection defining, at one end of it, the first or the second contact surface, respectively.

B3. The mould according to any one of paragraphs from B2 to B2.8.1, wherein the longitudinal axis is oriented along the weight force.

B3.1. The mould according to paragraph B3, wherein the first half mould is positioned under the second half mould along the longitudinal axis.

B4. The mould according to any one of paragraphs from B to B3.1, configured to make the object by compression moulding (or transfer moulding by compression).

B5. The mould according to any one of paragraphs from B to B4, wherein the first and the second half mould are shaped in such a way that the moulding space comprises a central zone, aligned with the longitudinal axis and intended to form a sprue of the object to be moulded, and a plurality of peripheral zones.

B5.1. The mould according to paragraph B5, wherein, when the mould is closed, an interrupting column is positioned between the central zone and each of the peripheral zones of the moulding space.

B5.2. The mould according to paragraph B5 or paragraph B5.1, wherein, when the mould is closed, the plunger defines a top end surface that delimits the bottom of the central zone of the moulding space.

B6. The mould according to any one of paragraphs from B to B5.2, comprising:
  a sensor, configured to detect the pressure exerted by the plunger;
  a control unit, connected to the sensor and to the thrust actuator to control the thrust actuator in response to that pressure.

B7. The mould according to any one of paragraphs from B to B6, wherein the plunger defines a top end surface which, when the mould is closed, delimits the bottom of a portion of the moulding space, the top end surface being provided with relief portions for forming corresponding impressions or weakened portions on the object.

C0. A machine for making objects from plastic (or polymeric) material.

C0.1. The machine according to paragraph C0, wherein the objects are made in a continuous cycle.

C. The machine according to paragraph C0 or C0.1, wherein the objects have a wall and a through hole formed in the wall.

C1. The machine according to any one of paragraphs from C0 to C, wherein the machine comprises a plurality of moulds, each mould of the plurality of moulds being made according to any one of paragraphs from B to B7.

C2. The machine according to any one of paragraphs from C0 to C1, comprising a rotary carousel that rotates about an axis of rotation, wherein the moulds of the plurality of moulds are associated with the carousel.

C3. The machine according to any one of paragraphs from C0 to C1, comprising:
  a lower die block, including a plurality of lower half moulds, adapted to simultaneously receive a corresponding plurality of doses;
  an upper die block, including a plurality of upper half moulds, wherein the upper die block and the lower die block are movable relative to each other between an open configuration, where they are spaced apart to allow the lower die block to receive the plurality of doses, and a closed configuration, where they form a plurality of closed moulding spaces, each of which is delimited by a corresponding lower half mould of the plurality of lower moulds and a corresponding upper half mould of the plurality of upper moulds.

C4. The machine according to any one of paragraphs from C to C3, wherein the machine is a machine for compression moulding (or transfer moulding by compression).

D0. An object of thermoplastic material, wherein the object is made by compression moulding (or transfer moulding by compression) from a dose of thermoplastic material and includes a wall that defines an outer surface without gate marks (relief marks—in the positive or in the negative with respect to the surface itself).

D. The object according to paragraph D0, comprising a through hole (or at least one hole or a plurality of through holes) formed in the wall.

D1. The object according to paragraph D0 or paragraph D, wherein the thermoplastic material is reinforced with fibres of a reinforcement material.

D2. The object according to any one of paragraphs from D0 to D1, having a shape that is flattened along a compression plane and wherein the thermoplastic material the object is made from is distributed uniformly along the compression plane.

D3. The object according to any one of paragraphs from D to D2, wherein the compression moulding (or transfer moulding by compression) is performed according to the method of any one of paragraphs from A to A6.

The invention claimed is:

1. A mould for making an object from plastic material, the object having a wall and a through hole formed in the wall, the mould comprising:
   a first half mould, including a body and a plunger, the plunger being movable relative to the body between a retracted position, where it acts in conjunction with the body to form a recess for receiving all or part of an extruded dose of plastic material, and an advanced position, where it at least partly occupies the recess;
   a second half mould, wherein the first and the second half mould are mutually movable along a longitudinal axis between an open position of the mould, to allow extracting the object from the mould, and a closed position of the mould, where they delimit a closed moulding space, the recess being open onto the moulding space;
   a thrust actuator, connected to the plunger to move it from the retracted position to the advanced position, thereby squeezing the dose so that the plastic material is forced to occupy the moulding space,
   wherein the first and the second half mould include a first and a second contact surface, respectively, the first and the second contact surface being, when the mould is at the closed position, abutted against each other so that the mould forms an interrupting column, which is surrounded by the moulding space, to form the through hole in the wall of the object,
   wherein the first and the second half mould are shaped in such a way that the moulding space comprises a central zone, aligned with the longitudinal axis and intended to form a sprue of the object to be moulded, and a plurality of peripheral zones and
   wherein, when the mould is closed, an interrupting column is positioned between the central zone and each of the peripheral zones of the moulding space, the peripheral zones being located on the outside of the central zone and surrounding the central zone,
   wherein the sprue extends in a transversal plane perpendicular to the longitudinal axis and each interrupting column is oriented parallel to the longitudinal axis.

2. The mould according to claim 1, wherein the plunger is movable along a thrust axis that is parallel to, or coincides with, the longitudinal axis and the interrupting column is misaligned with the thrust axis and wherein the longitudinal axis is oriented along the weight force, the first half mould being positioned under the second half mould along the longitudinal axis.

3. The mould according to claim 1, comprising:
   a sensor, configured to detect the pressure exerted by the plunger;
   a control unit, connected to the sensor and to the thrust actuator to control the thrust actuator in response to that pressure.

4. The mould according to claim 1, wherein the moulding space extends at least partly around the longitudinal axis and wherein the first or the second half mould comprises a drawer, movable along a transverse axis that intersects the longitudinal axis, the drawer defining, at one end of it, the first or the second contact surface, respectively.

5. The mould according to claim 1, comprising a plurality of interrupting columns, oriented longitudinally.

6. The mould according to claim 1, wherein the interrupting column is oriented longitudinally and wherein at least one between the first and the second half mould includes a projection connected to the rest of the respective half mould by an elastic element, the projection defining, at one end of it, the first or the second contact surface, respectively.

7. The mould according to claim 1, wherein the plunger defines a top end surface which, when the mould is closed, delimits the bottom of a portion of the moulding space, the top end surface being provided with relief portions for forming corresponding impressions or weakened portions on the object.

* * * * *